United States Patent [19]

Rudolphy et al.

[11] 4,197,378
[45] Apr. 8, 1980

[54] PROCESS FOR THE PREPARATION OF A MODIFIED HYDROCARBON RESIN

[75] Inventors: Albert Rudolphy; Kurt Hultzsch, both of Wiesbaden-Biebrich, Fed. Rep. of Germany

[73] Assignee: Hoechst Aktiengesellschaft, Fed. Rep. of Germany

[21] Appl. No.: 702,204

[22] Filed: Jul. 2, 1976

Related U.S. Application Data

[63] Continuation-in-part of Ser. No. 428,855, Dec. 27, 1973, abandoned.

[30] Foreign Application Priority Data

Dec. 30, 1972 [DE] Fed. Rep. of Germany ....... 2264284

[51] Int. Cl.$^2$ .......................... C08L 9/00; C08L 25/02
[52] U.S. Cl. .................................... 525/134; 525/139; 525/149
[58] Field of Search ................................ 260/848, 845

[56] References Cited

U.S. PATENT DOCUMENTS 3,468,829  9/1969  Yoshioka et al. .................. 260/27 R Primary Examiner—J. Ziegler
Attorney, Agent, or Firm—Quaintance, Murphy and Richardson

[57] ABSTRACT

A process for the preparation of a modified hydrocarbon resin suitable for use as a binder in a printing ink from a hydrocarbon resin (I) relatively unsuitable for use as a binder in a printing ink and having a melting point of at most 110° C. which comprises reacting in at least one step and in any desired sequence (I) as defined below with (II) approximately 3–20% as much by weight of a dicarboxylic acid unit as defined below and with (III) approximately 1–100% as much by weight of an alkyl phenol-aldehyde resin or its equivalent as defined below wherein (I) is a hydrocarbon resin containing at most 20% by weight of indene or methyl indene units and is based on a considerable proportion of polymerizable hydrocarbon monomers containing about 5 to 11 carbon atoms and at most 20% by weight of indene or methyl indene (II) is selected from the group consisting of
(IIa) an $\alpha$, $\beta$ olefinically unsaturated dicarboxylic acid and
(IIb) an equivalent amount of the corresponding dicarboxylic anhydride ester or amide of the dicarboxylic acid defined in (IIa) and (III) is selected from the group consisting of
(IIIa) an alkyl phenol aldehyde resin and
(IIIb) an amount of an alkyl phenol and an aldehyde equivalent to that of (IIIa);

the proportion of (I), (II) and (III) being correlated so that said modified hydrocarbon resin has a melting point of at least 120° C. and a viscosity as defined herein of at least 100 cP and a printing ink containing a binder obtained by said process.

9 Claims, No Drawings

PROCESS FOR THE PREPARATION OF A MODIFIED HYDROCARBON RESIN

This application is a continuation-in-part application of U.S. patent application Ser. No. 428,855, filed Dec. 27, 1973, now abandoned.

This invention relates to a process for producing resins suitable for use as binders for printing inks.

It is already known to produce hydrocarbon resins with different melting points, viscosities and bromine numbers over 10 by cationic polymerisation of monomers with an average of 5 or 9 C-atoms from unsaturated petroleum fractions. Such non-polar resins are very suitable for various applications such as paints or as additive resins for adhesives or rubber processing. They are relatively unsuitable as the sole printing ink binder in toluene intaglio printing because they do not have the properties required for toluene intaglio printing inks, namely rapid drying, high gloss and stability on paper.

It has also been proposed to modify non-polar hydrocarbon resins with an indene content of at least 20% by weight, a melting point (capillary) of at least 110° C. and a viscosity above 30 cP (50% in toluene/20° C.) by adding maleic anhydride. Such products are suitable as printing ink binders, particularly for toluene intaglio printing, but previously the starting substances for the hydrocarbon resins have generally had to be produced by fractionally distilling petroleum fractions several times in order to increase the indene content. It would be more desirable to use hydrocarbon resins which could be produced much more easily and economically without multiple distillation.

It has already been proposed to produce hydrocarbon resins with melting points below 110° C. and viscosities of 6 to 20 cP (50 toluene/20° C.) from fractions with a lower indene content. If these resins are modified with maleic anhydride the melting point and viscosity can be increased but the drying characteristics of these modified resins are not adequate for many applications.

According to a further proposal petroleum resins, phenolic resins and optionally maleic anhydride are reacted together to give products usable as printing inks and paints. If the products obtained by using maleic anhydride are reacted with linseed oil a suitable binder for off-set printing inks is obtained, although the product which is not modified with linseed oil is not suitable for this purpose.

The process of the invention has the merit that hydrocarbon resins are used which contain a maximum of 20% by weight of indenes. One aspect of this invention provides a process for the preparation of a modified hydrocarbon resin suitable for use as a binder in a printing ink from a hydrocarbon resin (I) relatively unsuitable for use as a binder in a printing ink and having a melting point of at most 110° C. which comprises reacting in at least one step and in any desired sequence (I) as defined below with (II) approximately 3–20% as much by weight of a dicarboxylic acid unit as defined below and with (III) approximately 1–100% as much by weight of an alkyl phenol-aldehyde resin or its equivalent as defined below wherein (I) is a hydrocarbon resin containing at most 20% by weight of indene or methyl indene units and is based on a considerable proportion of polymerizable hydrocarbon monomers containing about 5 to 11 carbon atoms and at most 20% by weight of indene or methyl indene (II) is selected from the group consisting of
 (IIa) an $\alpha,\beta$-olefinically unsaturated dicarboxylic acid and
 (IIb) an equivalent amount of the corresponding dicarboxylic anhydride ester or amide of the dicarboxylic acid defined in (IIa) and (III) is selected from the group consisting of
 (IIIa) an alkyl phenol aldehyde resin and
 (IIIb) an amount of an alkyl phenol and an aldehyde equivalent to that of (IIIa);

the proportion of (I), (II) and (III) being correlated so that said modified hydrocarbon resin has a melting point of at least 120° C. (capillary method) and a viscosity as defined herein of at least 100 cP (in 50% toluene solution).

The dicarboxylic esters of component (IIb) also include half esters. The use of anhydrides is preferred. Suitable $\alpha,\beta$-olefinically unsaturated dicarboxylic acid units include e.g. fumaric, citraconic, itaconic and mesaconic acids or their anhydrides in so far as they exist, esters, half esters or amides. Maleic acid or its anhydride is preferred.

According to the process of the invention the hydrocarbon resin can simultaneously be reacted e.g. in a single stage with a dicarboxylic acid unit and the components of the phenol-aldehyde condensation product. It is also however possible firstly to react the hydrocarbon resin initially in the presence of a catalyst conventionally used for phenol resin formation with the components of the phenol-aldehyde condensation product and then with the dicarboxylic acid unit. It is also possible to start with the hydrocarbon resin and an $\alpha,\beta$-olefinically unsaturated carboxylic acid unit in the presence of which the phenol-aldehyde condensation product is prepared from the components thereof and then the $\alpha,\beta$-olefinically unsaturated dicarboxylic acid unit is reacted. In this connection one can either react it with the phenol-aldehyde resin component or the hydrocarbon resin component or both.

According to one embodiment it is e.g. possible either initially to react the hydrocarbon resin with the phenol-aldehyde condensation product and then with the dicarboxylic acid unit or the hydrocarbon resin initially with the dicarboxylic acid unit and then with the phenol-aldehyde condensation product or the phenol-aldehyde condensation product initially with the dicarboxylic acid unit and then with the hydrocarbon resin. Alternatively in the process of the invention a residual amount of the first two reactants is reacted in at least one step simultaneously or subsequent to the reaction with the third reactant.

Thus inter alia the following possibilities exist:
(i) the hydrocarbon resin is first reacted with said dicarboxylic acid unit and subsequently with the components of the phenol-aldehyde condensation product; or
(ii) the hydrocarbon resin is simultaneously reacted in one step with said dicarboxylic acid unit and with the components of the phenol-aldehyde condensation product; or
(iii) the hydrocarbon resin is first reacted with the phenol-aldehyde condensation product or its components and subsequently with said dicarboxylic acid unit, the reaction with the components of the phenol-aldehyde condensation product being performed in the presence of a catalyst; or (iv) the phenol-aldehyde condensation product is first prepared from its components in the presence of the hydrocarbon resin and of the said dicarboxylic acid unit and is subsequently reacted with the hydrocarbon resin and said dicarboxylic acid unit; or (v) the phenol-aldehyde condensation product is first reacted with said dicarboxylic acid unit in anhydride form and subsequently with the hydrocarbon resin.

The resins obtained according to the invention can be used without further modification, e.g. such resins with a viscosity of 200 to 400 cP are suitable as binders for intaglio printing inks.

Embodiment (iii) leads to considerable technical simplification. In addition this process permits the preparation of products with a higher proportion of phenol than would be possible with the known processes without the viscosity being excessively increased. Nevertheless products are obtained which can be used as printing binders. The increased proportion of phenol provides the advantage that the printing inks produced therefrom liberate the solvent more rapidly after printing than printing inks based on binders with a lower phenol content.

The process according to the invention therefore permits the conversion of easily producible low melting resins to products with high grade characteristics. This leads to improved characteristics in the printing ink produced from the binders. In addition due to the double modification the polarity of the resins is also increased. It is therefore possible to start with resins having a low indene content e.g. those with an indene content of less than 15% by weight and by means of a much more simple process to produce therefrom as high grade and high melting products as could hitherto only be obtained from hydrocarbon resins with indene contents of 30 to 80% by weight after maleic anhydride addition.

For these reasons the starting substances used are generally low melting and/or low viscosity hydrocarbon resins, for example those with a melting point of at most 110° C. These resins generally have a low indene content. In individual cases the melting point can also be higher e.g. if resins with a high indene content are used, but then smaller quantities of maleic acid are used. As a result the effect of increasing the melting point is generally reduced. Suitable starting resins are particularly hydrocarbon resins based on fractions with a considerable proportion i.e. an amount of 20 to 100% by weight, referred to the total of polymerizable monomers, of olefinically unsaturated monomers with on average 5 or 9 or both C-atoms, wherein the $C_9$ portions can also contain dicyclopentadiene; or resins with a large proportion, i.e. an amount of 15 to 50% by weight, referred to the total polymerizable monomers, of methylcyclopentadiene; or resins having bromine numbers of 10 to 120, or combinations of these resins including cumarone-indene resins. Suitable monomers for inclusion in the hydrocarbon resins are styrene, α-and β-methyl-styrene, vinyl toluenes, mono- and dicyclopentadiene as well as small quantities of indene or methylindene. Generally the hydrocarbon resins particularly suitable for modification with the dicarboxylic unit and phenolic resins have a low indene content, the proportion of indenes including substituted indenens being at most 20, preferably at most 15% by weight.

According to one embodiment, additional unsaturated monomers are chemically incorporated in the product during of after its formation. As a result resins are obtained whose properties can in varying ways be controlled by the quantity of monomers added. Suitable monomers are for example those with 2 to 12, preferably 4 to 10 C-atoms, such as one or more of styrene, α-methylstyrene, the various vinyltoluenes, indene, dicyclopentadiene or mixtures of olefinically unsaturated, hydrocarbons as for example are obtained as fractions during petroleum distillation. The presence of such monomers also has the advantage that they can be used as solvents or entraining agents to remove water which may be formed during the reaction according to the invention.

The proportion of the additional unsaturated monomers is appropriately 1 to 20, preferably 3 to 15% by weight and the proportion of the dicarboxylic acid units 3 to 20, preferably 4 to 12% by weight, and that of the phenol condensate 1 to 100, preferably 3 to 50% by weight, in each case based on the starting hydrocarbon resin. Products with no more that 50% by weight of phenolic resin have an adequate solubility in particular in aromatic hydrocarbons.

It is also possible to incorporate natural resinic acids such as colophony, abietic acid, tall resinic acid, or wood resin, e.g. in a proportion of up to 17 or 20% by weight based on the starting hydrocarbon resins. As a result it is possible to control the viscosity. These natural resins can be admixed with the starting components, particularly the starting resin during the reaction according to the invention or can be reacted with the reaction components. The natural resins can be used as such or in the form of their esters or resinates. It is also possible for the acid groups of the natural resins to be reacted subsequently in per se known manner with resinate and/or ester formation; however the first possibility is preferred. A further possibility involves mixing the natural resin or esters or resinates thereof with the end product. As a result the viscosity of the end products can be regulated to the desired extent.

Suitable phenolic resins are novolaks or resols, such as those of phenol, phenol substituted by hydrocarbon groups, such as alkyl, aryl or aralkylphenols, e.g. cresols, such as m-cresol, 1,3,5-xylenols, isopropyl-, p-tert.-butyl-, amyl-, octyl- or nonylphenol, phenylphenol or cumylphenol, as well as bisphenols e.g. diphenylol-propane or -methane. The resins of tri-functional phenols i.e. those resins wherein three o- and/or p-positions relative to the phenolic OH groups(s) are free and reactive are preferred. The indicated at least trifunctional phenols or the corresponding phenol resins are generally only used together with a bifunctional phenol component e.g. the indicated alkylphenols and/or addition products of unsaturated monomers to phenols. The tri or higher functional phenols, e.g. phenol or diphenylolpropane can be used in a proportion of up to 50%, preferably up to 25% by weight based on the total quantity of phenols. As a result an adequate solubility of the end products, particularly in aromatic hydrocarbons, is ensured. As aldehyde components of phenol resins are mentioned e.g. aldehydes with 1 to 7 C-atoms particularly formaldehyde, in various monomeric and polymeric forms as well as other aldehydes such as acetaldehyde, butyraldehyde, isobutyraldehyde, benzaldehyde and furfural.

The molar ratio phenol:aldehyde can vary within wide limits, e.g. at least 1:0.9 and at maximum 1:5; any unused aldehyde can be distilled off. As a result of the use of the phenolic resin component in the starting mixture the viscosity of the end products can easily be controlled. The phenols can also be used in the form of mixed condensates of various phenols. It is also possible to react them in the form of adducts with the above-indicated unsaturated monomers to form phenolic resins. A further modification of the starting resin or the end product with monomers is not necessary in this embodiment but is not expressly excluded.

If the phenolic resins are reacted in the form of their components or as adducts of said components to the unsaturated monomers, during the reaction in the presence of unsaturated dicarboxylic acid units in particular maleic anhydride, advantageously the acidity of the maleic anhydride formed is initially used for catalysing the phenolic resin condensation and the maleic anhydride or maleic acid is gradually added to the reaction product, for example at gradually increasing temperatures.

The products obtained according to the invention can also be modified in that additionally telomers of olefinically unsaturated monomers (e.g. styrene) and maleic anhydride are incorporated e.g. in the molar ratio 0.5:1 to 20:1. The addition can be before, during or after the reaction, preferably in admixture with the starting hydrocarbon resin.

The reaction takes place at elevated temperature in the melt or in solution, whereby the monomers can serve as solvents. Generally reaction takes place at 100° to 270°, preferably 110° to 250° C.; in individual cases it is possible to go above or below the indicated range. It is possible but not absolutely necessary to use in addition to the dicarboxylic acid a catalyst such as organic and inorganic acids or their salts, such as oxalic acid, dilute sulphuric acid, hydrochloric acid or other condensation agents known or conventionally used for phenolic resin production. Their proportion is generally up to 3%, preferably up to 0.5% by weight based on the phenolic components. These catalysts are also suitable for the embodiment (iv) of the process according to the invention, according to which the phenolic resin is produced, e.g. by acid condensation and the reaction is performed directly.

Together with, or in place of the unsaturated monomers, it is possible to use further solvents. Suitable solvents include aromatic or aliphatic hydrocarbons and mixtures thereof, for example toluene, xylene, and mixtures of unpolymerised aliphatic and/or aromatic hydrocarbons, e.g. fractions from petroleum distillation.

In the following Examples % relates to % by weight. The viscosity values relate to measurements according to Ubbelohde in 50% toluene solution at 20° C.

EXAMPLE 1

200 g of a hydrocarbon resin with an approximately 15% indene content (melting point/capillary method 95° C., acid number 0, viscosity 20 cP, bromine number 35) are melted and reacted with 7.5 g of maleic anhydride at 150° to 160° C. for 1 hour. Subsequently 100 g of a resin prepared by alkaline condensation from 1 mol of p-tert.-butylphenol and 1.6 mols of formaldehyde (melting point/capillary method 70° C.) are added; the mixture is heated for 45 minutes to 200° C. 292 g of resin (melting point/capillary method 133° C., acid number 34, viscosity 202 cP) are obtained.

Compared to the starting resin the melting point of the reaction product is increased by 66° C., the viscosity by 180 cP. The resin as a binder yields excellent toluene intaglio inks.

EXAMPLE 1a

The preparation is performed in accordance with Example 1, but differing in a further addition of 2.5 g of maleic anhydride after adding the alkylphenol resin and after reaching 200° C., 296 g of resin (melting point/capillary method 135° C., acid number 36, viscosity 244 cP) are obtained.

The viscosity of the resin is higher than in the product of Example 1. As a vehicle for printing ink binders the resin shows excellent printing properties for toluene intaglio inks.

EXAMPLE 2

In a reaction vessel with reflux condenser and a device to remove the water formed 150 g of the starting hydrocarbon resin used in Example 1 are first melted and, together with 7.5 g of maleic anhydride, heated for 1 hour at 160° C. Subsequently 30 ml of toluene and at 120° C. 75 g of the alkyl phenol resin according to Example 1 are added. The condensation water formed and toluene are removed by heating to 240° C. first under normal pressure and finally under a pressure of 25 mmHg for 5 minutes. 221 g of resin (melting point/capillary method 142° C., acid number 46, viscosity 275 cP) are obtained.

The resin represents an excellent binder for rotogravure printing inks. The melting point and the viscosity are higher than those of the resins prepared according to the Examples 1 and 1a.

EXAMPLE 2a

The preparation is performed according to Example 2 but differing insofar as, calculated on 150 g of the hydrocarbon resin, 10 g of maleic anhydride and 100 g of the alkylphenol resin according to Example 1 are used under the same reaction conditions. 245 g of resin (melting point/capillary method 144° C., acid number 50, viscosity 400 cP) are obtained.

EXAMPLE 3

In a melt of 100 g of a hydrocarbon resin with low indene content (melting point 80° C., viscosity 10 cP) prepared from a hydrocarbon fraction of monomers with 9 carbon atoms (vinyltoluene, styrene, indene) 100 g of a styrene-maleic anhydride-telomer containing 1 mol of maleic anhydride and 8 mols of styrene are added and 7 g of maleic anhydride are incorporated into the molten mixture. After heating for 1 hour at 200° C. 100 g of the alkylphenol resin are gradually added according to Example 1. Within 30 minutes the temperature is increased to 240° C., maintained for 15 minutes and the mixture is then continuously heated for further 15 minutes under 50 mmHg until the volatile components are completely removed. 289 g of resin (melting point/capillary method 131° C., acid number 45, viscosity 267 cP) are obtained.

By double modification of the mixture of non-polar hydrocarbon resin and the polar telomer resin the melting point and viscosity are increased, thus leading to good printing properties.

EXAMPLE 4

150 g of the hydrocarbon resin used as starting material in Example 3 are reacted at 120° C. with 75 g of p-tert.-butylpheno and 30 g of paraformaldehyde, and 25 g of styrene and 25 g of maleic anhydride are added. The mixture is condensed under reflux for 1 hour at 110° C.; the reflux cooler is then replaced by a water separator and the water formed is removed by heating for 1 hour at 140° C. The remaining volatile substances are removed by heating for 1 hour to 250° C. under normal pressure and finally for 15 minutes at 50 mmHg. 280 g of resin (melting point/capillary method 139° C., acid number 47.6, viscosity 375 cP) are obtained.

Also according to this embodiment a high-melting and viscous binder with excellent printing properties is obtained.

EXAMPLE 5

If the hydrocarbon resin used in Example 4 is substituted by the same amount of a cyclopentadiene/methylcyclopentadiene polymer resin prepared in the conventional manner by pressure polymerisation (melting point/capillary method 75° C., acid number 1.9 and bromine number 120), 275 g of a resin having a melting point/capillary method of 165° C., acid number of 44 and a viscosity of 1490 cP are obtained under the same conditions.

This Example shows clearly the influence of the starting polymer with a high bromine number.

This binder also shows the pronounced effect of double modifying in connection with the increase in melting point and viscosity.

EXAMPLE 6

Proceeding according to Example 5, but using only 75 g of the starting resin used therein and with 75 g of hydrocarbon resin according to Example 3, 275 g of resin are obtained having the following data: melting point/capillary method 153° C., acid number 43, viscosity 620 cP.

This Example clearly shows the effect produced by the selection of polymer resins having a different structure. By the use of the hydrocarbon resin containing a substantial amount of monomers with 9 carbon atoms it is possible, for example, to decrease considerably the viscosity as compared with Example 5.

EXAMPLE 7

750 g of hydrocarbon resin—as starting resin according to Example 3—are melted with 375 g of p-tert.-butylphenol. Subsequently 200 g of a hydrocarbon fraction obtained from petroleum distillation (38% styrene, 27% xylene, 15% ethylbenzene, 18% cumol and 12% methylethylbenzene-1,4) and at 120° C. 170 g of paraformaldehyde and 125 g of maleic anhydride are added. It is processed according to Example 4. 1412 g of resin are obtained having the following data: melting point 138° C., acid number 40, viscosity 477 cP.

EXAMPLE 8

750 g of hydrocarbon resin as starting material (as used in Example 3) are melted and then 200 g of p-tert.-butylphenol and 200 g of an addition product prepared in the conventional manner from 1776 g of phenol, 1840 g of styrene and 1.3 ml of a 65% para-phenolsulfonic acid, 90 g of paraformaldehyde, 125 g of maleic anhydride and 50 ml of toluene are added. Subsequently the condensation is performed in accordance with Example 7. 1241 g of resin are obtained with the following data: melting point/capillary method 131° C., acid number 43, viscosity 660 cP.

The resins prepared according to Examples 7 and 8 represent good binders for intaglio printing.

EXAMPLE 9

200 g of p-tert.-butylphenol, 100 g of phenol, 160 g of Portuguese colophony, 120 g of styrene and 900 g of a cyclopentadiene-methylcyclopentadiene-polymerisate resin melting at 75° C. having a bromine number of 120 are liquefied in a reaction vessel. 85 g of paraformaldehyde and 150 g of maleic anhydride are then added at 130° C. The mixture is condensed under reflux for 2 hours at 115° to 122° C. The reflux cooler is replaced by a water separator and the water formed as well as the unreacted volatile components are removed by heating successively to 140° C., 200° C. and 250° C. each time for 1 hour and finally for 15 minuts at 250° C. and 50 mmHg. 1422 g of resin are obtained having the following data: melting point 177° C., acid number 50.5 and viscosity 520 cP.

This product too is a very good printing ink resin.

EXAMPLE 10

100 g of Portuguese colophony, 100 g of p-tertiary butylphenol, 86 g of phenol, 14 g of an aqueous 37% formaldehyde solution and 100 g of the same polymerisation resin as it is used in example 5 are molted together in a 4 liter vessel equiped with a reflux condenser. At 103° C. 15 g of calcium acetate, 130 g of maleic acid and 35 g of paraformaldehyde are added. A weak exothermic reaction and reflux occur. After decrease of the reaction a water separator is installed and the reaction mass is heated within 6 hours to 215° C. under elimination of the water formed (42 ml). Then 50 g of styrene are added within 2 hours under temperature increased to 235° C. The temperature is further increased to 250° C. and maintained at this temperature for 1 hour. Subsequently it is worked under vacuum of 50 mmHg to eliminate the volatile components of the reaction mass. After 10 minutes the reaction is stopped. 1466 g of resin are obtained having the following data: melting point (capillary) 160° C., acid number 34, viscosity 265 cP.

The binder is suitable for quickly drying intaglio printing inks having a good hold-out on satinized paper and a high gloss of the prints.

PRINTING TESTS

The binders were dissolved in toluene to form 50% solutions and processed in a high speed glass ball mill with 20% "Pigmentrot 57" (=calcium salt lacquer of β-oxynaphthoic acid), based on the solid content, to produce a particle size of less than 5μ. The printing inks obtained were adjusted by the addition of toluene in 4 mm DIN- cup to 17 sec. efflux time. The residue of the printing inks was determined by heating in the drier for 30 minutes at 150° C. The printing inks were applied to machine coated paper and a non-absorbent terephthalate-foil respectively by means of a "hand coater" (coiled wire) at a wet film thickness of 36μ. The drying speed of the printing inks was determined in seconds by applying pressure with the side of the hand.

The obtained printing ink coatings on paper were stored over night and the gloss was determined by means of a gloss meter according to Lange/100% scale. After storage of 4 weeks the storage stability was determined by renewed measuring of the efflux times.

COMPARATIVE EXAMPLES 11–13

Comparative printing ink 11: The bind is a conventional hydrocarbon polymer modified with maleic anhydride and prepared from petroleum fractions of high indene content (with large amount of unsaturated $C_9$ compounds but more than 40% of indenes) also containing copolymerised styrene and vinyltoluene. Characteristics: melting point/capillary method 140° C., acid number 34, viscosity 110 cP.

Comparative printing ink 12: The binder is a conventional non-polar hydrocarbon resin prepared by polymerisation from petroleum fractions of low indene (15% indene content) and high styrene content containing a large amount of $C_9$ unsaturated compounds—especially vinyltoluene. Characteristics: melting point/capillary method 95° C., acid number 0, viscosity 19 cP.

Comparative printing ink 13: The binder is a conventional polymerisation resin prepared by pressure polymerisation of a mixture of cyclopentadiene and free from indene and methylcyclopentadiene. Characteristics: melting point/capillary method 75° C., acid number 1.9, viscosity 9.9 cP, bromine number 120.

250° C. The mixture is kept at this temperature for a further 50 minutes, and during the last 5 minutes working takes place under reduced pressure (70 mmHg). 2110 g of a resin having a melting point of 183° C., an acid number of 45 and a viscosity of 288 cP are obtained. The resin is an excellent binder for intaglio printing inks.

It is not intended that the examples given herein should be construed to limit the invention thereto, but rather they are submitted to illustrate some of the specific embodiments of the invention. Resort may be had to various modifications and variations of the present invention without departing from the spirit of the discovery or the scope of the appended claims.

What we claim is:

1. A process for the preparation of a modified hydrocarbon resin suitable for use as a binder in a printing ink from a hydrocarbon resin (1) relatively unsuitable for use as a binder in the printing ink and having a melting

TABLE

| Printing ink from example Printing ink from comparative resin | 1 | 1a | 2 | 2a | 3 | 4 | 5 | 6 | 7 | 8 | 9 | 10 | 11 | 12 | 13 |
|---|---|---|---|---|---|---|---|---|---|---|---|---|---|---|---|
| Residue of the printing ink in % | 43.5 | 43.3 | 41.3 | 40.0 | 40.3 | 44.6 | 36 | 39 | 43.9 | 43.7 | 42.8 | 42.1 | 46.0 | 51.0 | 48.8 |
| Efflux time of the printing ink DIN/4 mm in sec. | 16.8 | 17.2 | 17 | 17.1 | 16.9 | 17.2 | 17 | 17 | 17 | 16.8 | 16.9 | 17.1 | 16.8 | 17.2 | 17.2 |
| Solvent release in sec. | | | | | | | | | | | | | | | |
| Machine coated paper | 44 | 43 | 45 | 42 | 40 | 43 | 41 | 42 | 45 | 50 | 52 | 48 | 55 | 100 | 200 |
| Terephthalato foil | 51 | 50 | 50 | 49 | 50 | 48 | 48 | 50 | 45 | 51 | 56 | 48 | 58 | 120 | 230 |
| Gloss value according to LANGE | | | | | | | | | | | | | | | |
| Machine coated paper | 100 | 100 | 100 | 99 | 100 | 100 | 100 | 100 | 94 | 100 | 90 | 100 | 95 | 75 | 50 |
| Efflux time after storage of 4 weeks in seconds | 22 | 23 | 23 | 23 | 24 | 25 | 23 | 24 | 25 | 24 | 22 | 23 | 24 | 300 | 480 |

As is shown in the preceding table, the printing inks prepared from the resins according to Examples 1 to 10 dry considerably quicker than the comparative printing inks 11 to 13. The efflux time after storage for 4 weeks in samples 1 to 10 shows a low viscosity increase substantially the same as that of comparative printing ink 11. Generally the gloss values of samples 1 to 9 with only two exceptions—are improved compared with comparative printing ink 11 of high indene content.

The numerical values of samples 1 to 10 compared with those of samples 12 and 13 shows the great improvement in printing properties obtained by double modifying the resins as against non-modified resins of Examples 12 and 13. Furthermore the comparison of samples 1 to 10 with sample 11 shows that, by double modifying the lower melting point hydrocarbon resins of low indene content, high quality products are obtained which are not inferior in their properties to those of the maleic acid modified hydrocarbon resins of high indene content, but are often even superior thereto.

EXAMPLE 14

225 g of p-tert.-butylphenol, 200 g of maleic anhydride, 150 g of toluene and 105 g of paraformaldehyde are melted in a reaction vessel. The mixture is heated for 1 hour to 90° C. and finally under reflux for 10 minutes to a temperature range from 98° to 103° C. Subsequently at 100° to 110° C. 100 g of colophony and 1500 g of a cyclopentadiene-methylcyclopentadiene copolymer melting at 68° C. (bromine number 140) and 130 g of phenol are added accompanied by stirring. The reflux condenser is replaced by a water separator and with constant removal of water the reaction vessel is heated for 2 hours to 200° C. and for a further hour to point of at most 110° C. which comprises reacting in a multiplicity of steps at first a starting reactant
(I) at least one hydrocarbon resin containing indene or methylindene units hydrocarbon fractions containing olefinically unsaturated monomers with on average 9 carbon atoms, and
(Ia) a combination of (I) with an olefinically unsaturated monomer hydrocarbon selected from the group consisting of aromatic hydrocarbons of 6 to 12 carbon atoms, with
(II) 3 to 20% as much as weight of a dicarboxylic acid unit selected from the group consisting of
(IIa) an $\alpha,\beta$-olefinically unsaturated dicarboxylic acid and
(IIb) an equivalent amount of the corresponding dicarboxylic anhydride or ester of the dicarboxylic acid as defined in (IIa) and subsequently with 1 to 100% as much by weight of an alkylphenol-aldehyde resin component III; the proportion of (I), (II) and (III) being correlated so that said modified hydrocarbon resin has a melting point of at least 120° C. of at least 100 centipoise.

2. A process as claimed in claim 1 wherein the starting hydrocarbon resin is a resin having a bromine number of between 10 and 120 and a melting point of at most 110° C.

3. A process as claimed in claim 1 wherein the reaction of (I) with (II) and (III) is performed in the melt.

4. A process as claimed in claim 1 wherein the amount of the unsaturated dicarboxylic acid unit is 3 to 20% by weight, the amount of the alkylphenol-aldehyde condensate is 1 to 100% by weight, each percentage being referred to the starting hydrocarbon resin and wherein the molar proportion of the unsaturated monomer to the unsaturated dicarboxylic acid unit is (0.5 to 20):1.

5. The process of claim 1 wherein the reaction of (I) with (II) and (III) is performed in the presence of 1 to 20% as much by weight of the olefinically unsaturated monomer hydrocarbon.

6. A process as claimed in claim 1 wherein the $C_9$-fraction does contain dicyclopentadiene.

7. A printing ink containing a binder obtained by a process as claimed in claim 1.

8. A process as claimed in claim 1 wherein component (I) is reacted with 4 to 12% as much by weight of component (II) and with 3 to 50% as much by weight of component (III) and the proportions of (I), (II), and (III) being correlated so that said modified hydrocarbon resin has a melting point of at least 120° C. and a viscosity of at least 100 centipoise.

9. A process as claimed in claim 1 wherein component (I) is reacted in combination with an olefinically unsaturated monomer hydrocarbon selected from the group consisting of aromatic hydrocarbons of 6 to 12 carbon atoms.

* * * * *